United States Patent
Sekine et al.

(10) Patent No.: US 11,806,952 B2
(45) Date of Patent: Nov. 7, 2023

(54) PREFORM SHAPING APPARATUS, PREFORM SHAPING METHOD AND COMPOSITE MATERIAL MOLDING METHOD

(71) Applicant: SUBARU CORPORATION, Tokyo (JP)

(72) Inventors: Naoyuki Sekine, Tokyo (JP); Yuta Inoue, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 140 days.

(21) Appl. No.: 16/880,584

(22) Filed: May 21, 2020

(65) Prior Publication Data

US 2021/0060871 A1    Mar. 4, 2021

(51) Int. Cl.
*B29C 70/00* (2006.01)
*B29B 11/00* (2006.01)
(Continued)

(52) U.S. Cl.
CPC .............. *B29C 70/48* (2013.01); *B29B 11/08* (2013.01); *B29B 11/16* (2013.01); *B29C 70/302* (2021.05);
(Continued)

(58) Field of Classification Search
CPC ....... B29C 70/00; B29C 70/30; B29C 70/302; B29C 70/40; B29C 70/48; B29C 70/50;
(Continued)

(56) References Cited

U.S. PATENT DOCUMENTS 5,817,265 A    10/1998    Gendreau
5,882,462 A    3/1999    Donecker et al.
(Continued)

FOREIGN PATENT DOCUMENTS

DE    10 2012 104 044 A1    11/2013
EP        1 731 282 A1    12/2006
(Continued)

OTHER PUBLICATIONS

Extended European Search Report dated Dec. 14, 2020 for European Patent Application No. 20180971.2-1017.
(Continued)

*Primary Examiner* — Jacob T Minskey
*Assistant Examiner* — Matthew Hoover
(74) *Attorney, Agent, or Firm* — MCGINN I.P. LAW GROUP, PLLC

(57) ABSTRACT

According to one implementation, a preform shaping apparatus includes at least one mold and at least one pin. The at least one mold is a mold for placing and shaping a laminated body of fiber sheets which is a material of a fiber reinforced plastic. The at least one pin prevents the fiber sheets from being misaligned by stinging the laminated body of the fiber sheets with the at least one pin. Further, according to one implementation, a preform shaping method for producing a preform includes: placing a laminated body of fiber sheets, which is a material of a fiber reinforced plastic, on at least one mold; shaping the laminated body of the fiber sheets; and preventing the fiber sheets from being misaligned by stinging the laminated body of the fiber sheets with at least one pin.

15 Claims, 8 Drawing Sheets

(51) Int. Cl.
  *B29C 70/48* (2006.01)
  *B29B 11/08* (2006.01)
  *B29B 11/16* (2006.01)
  *B29C 70/54* (2006.01)
  *B29C 70/30* (2006.01)
  *B29K 105/00* (2006.01)

(52) U.S. Cl.
  CPC ...... *B29C 70/543* (2013.01); *B29K 2105/253* (2013.01)

(58) Field of Classification Search
  CPC ....... B29C 70/54; B29C 70/543; B29B 11/00; B29B 11/08; B29B 11/10; B29B 11/16
  See application file for complete search history.

(56) References Cited

U.S. PATENT DOCUMENTS

| | | | |
|---|---|---|---|
| 2004/0219251 A1* | 11/2004 | Eberth | B29B 11/16 264/511 |
| 2007/0149080 A1 | 6/2007 | Asahara et al. | |
| 2015/0008619 A1 | 1/2015 | Maertiens | |
| 2015/0048555 A1 | 2/2015 | Nagasaki et al. | |
| 2016/0288380 A1 | 10/2016 | Marchal et al. | |
| 2018/0186101 A1 | 7/2018 | Ikeda et al. | |

FOREIGN PATENT DOCUMENTS

| | | |
|---|---|---|
| EP | 2 829 569 A1 | 1/2015 |
| EP | 3 321 055 A1 | 5/2018 |
| JP | H07-214708 A | 8/1995 |
| JP | H11-512670 A | 11/1999 |
| JP | 2007-001298 A | 1/2007 |
| JP | 2009-119701 A | 6/2009 |
| JP | 2009-226654 A | 10/2009 |
| JP | A 2016-010926 A | 1/2016 |
| JP | A 2016-036963 A | 3/2016 |
| JP | 2017-213819 A | 12/2017 |

OTHER PUBLICATIONS

Extended European Search Report dated Dec. 7, 2020 for European Patent Application No. 2018-0972.0-1017.
Extended European Search Report dated Jun. 17, 2022 for European Patent Application No. 22156343.0-1103.
Communication pursuant to Article 94(3) EPC dated Nov. 7, 2022, in European Application No. 20 180 972.0.
Communication pursuant to Article 94(3) EPC dated Jan. 19, 2023, in European Application No. 20 180 971.2.
United States Office Action dated Feb. 9, 2023, in co-pending U.S. Appl. No. 16/880,605.
Examiner-provided machine translation of "Tsuji, JP2007001298 Machine translations (Year: 2007)".
Japanese Office Action, dated May 23, 2023, in Japanese Application No. 2019-159153 and English Translation thereof.
Japanese Office Action, dated Jul. 11, 2023, in Japanese Application No. 2019-159135 and English Translation thereof.
United States Notice of Allowance dated Jun. 7, 2023, in co-pending U.S. Appl. No. 16/880,605.

* cited by examiner

… (1)

PREFORM SHAPING APPARATUS, PREFORM SHAPING METHOD AND COMPOSITE MATERIAL MOLDING METHOD

CROSS REFERENCES TO RELATED APPLICATIONS

This application is based upon and claims the benefit of priority from Japanese Patent Application No. 2019-159153, filed on Aug. 30, 2019; the entire contents of which are incorporated herein by reference.

FIELD

Implementations described herein relate generally to a preform shaping apparatus, a preform shaping method and a composite material molding method.

BACKGROUND

Conventionally, RTM (Resin Transfer Molding) method has been known as a method of molding an FRP (Fiber Reinforced Plastic), such as GFRP (Glass Fiber Reinforced Plastic) or CFRP (Carbon Fiber Reinforced Plastic), called a composite material, consisting of resin reinforced with fibers.

The RTM method is a molding method of a composite material by which fiber sheets are impregnated with thermosetting resin and thermally cured after laminating the fiber sheets. The RTM method by which fibers are impregnated with resin by vacuuming is called VaRTM (Vacuum assisted Resin Transfer Molding) method while the RTM method by which fibers are impregnated with resin using molds is called Matched-die RTM method.

When a composite material is molded by the RTM method, a dry preform is produced in advance of impregnation with resin. A dry preform is produced by shaping a laminated body of fibers sheet according to a shape of a molded composite material. Such a dry preform produced by laminating fiber sheets is often fixed temporarily by interposing thermoplastic binder so that the fibers may not loosen.

A tape-like fiber base material is called a dry tape material. A dry tape material in which thermoplastic non-woven fabric has been laminated, and a dry tape material to which thermoplastic particulates have been attached are commercially available. Accordingly, when dry tape materials including thermoplastic binder are laminated, a dry tape material can be temporarily fixed to an adjacent dry tape material by heat-sealing the binder in spots at a certain interval using a dedicated heater. Thereby, slippage and separation of the laminated dry tape materials can be prevented.

Thus, it is important to prevent fibers or prepregs to be laminated from deviating at the time of molding a composite material. For that reason, a method of pinning an excess part of fibers or prepregs is also known (for example, refer to Japanese Patent Application Publication JPH07-214708 and Japanese Patent Application Publication JPH11-512670).

When a laminated body of dry tape materials is placed on a mold in order to form a composite material by the Matched-die RTM method, the dry tape materials sometimes slip during a period from placing the laminated body of the dry tape materials on the mold till pressing the laminated body of the dry tape materials. The positional gaps of the dry tape materials leads to deterioration in the quality of a dry preform and a molded product thereof.

Accordingly, an object of the present invention is to reduce positional gaps of fibers in case of molding a composite material by an RTM method.

SUMMARY OF THE INVENTION

In general, according to one implementation, a preform shaping apparatus includes at least one mold and at least one pin. The at least one mold is a mold for placing and shaping a laminated body of fiber sheets which is a material of a fiber reinforced plastic. The at least one pin prevents the fiber sheets from being misaligned by stinging the laminated body of the fiber sheets with the at least one pin.

Further, according to one implementation, a preform shaping method includes: producing a preform by the above-mentioned preform shaping apparatus.

Further, according to one implementation, a preform shaping method for producing a preform includes: placing a laminated body of fiber sheets, which is a material of a fiber reinforced plastic, on at least one mold; shaping the laminated body of the fiber sheets; and preventing the fiber sheets from being misaligned by stinging the laminated body of the fiber sheets with at least one pin.

Further, according to one implementation, a composite material molding method includes: producing the fiber reinforced plastic by impregnating the preform with resin, and curing the resin. The preform is produced by the above-mentioned preform shaping method.

DETAILED DESCRIPTION

A preform shaping apparatus, a preform shaping method and a composite material molding method according to implementations of the present invention will be described with reference to the accompanying drawings.

First Implementation (Structure and Function of Preform Shaping Apparatus)

Figure 1:
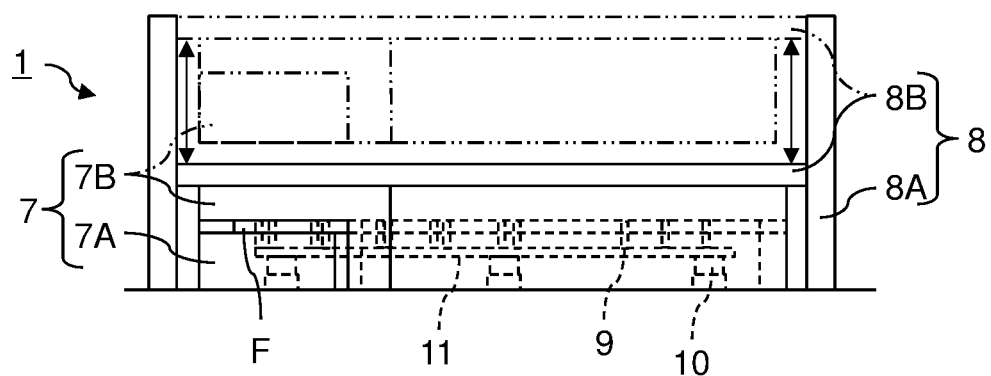
FIG. 1 is a front view of a preform shaping apparatus according to the first implementation of the present invention.
Figure 2:
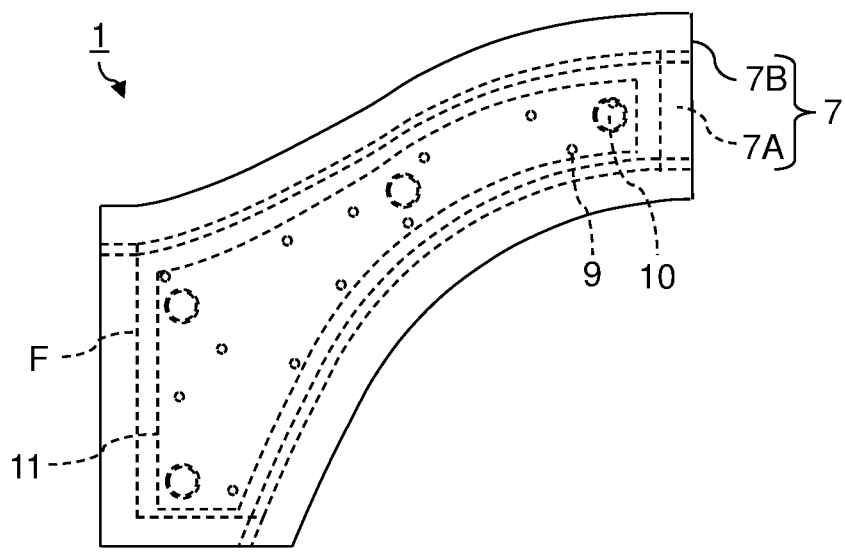
FIG. 2 is a top view of a mold included in the preform shaping apparatus shown in FIG. 1.
Figure 3:
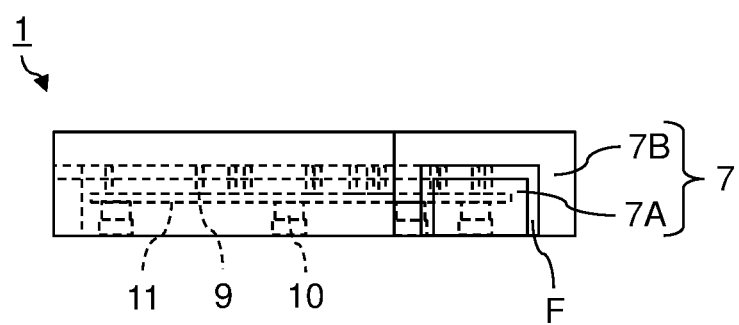
FIG. 3 is a right side view of molds included in the preform shaping apparatus shown in FIG. 1.
Figure 4:
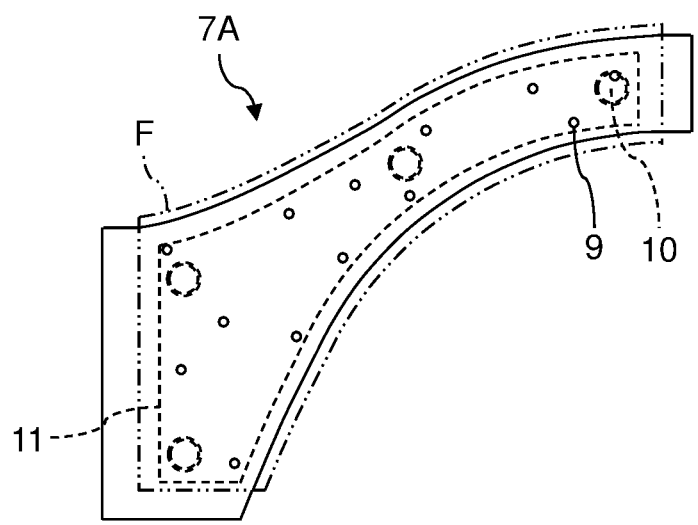
FIG. 4 is a top view of a lower mold included in the preform shaping apparatus shown in FIG. 1.
Figure 5:
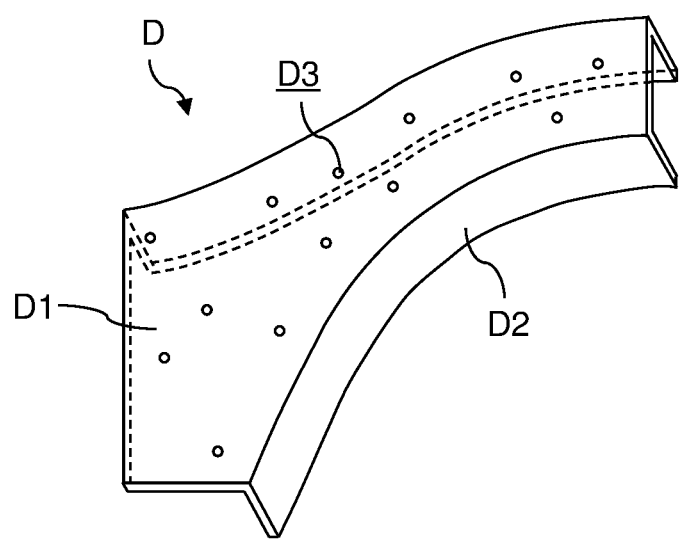
FIG. 5 is a perspective view of a dry preform produced by the preform shaping apparatus shown in FIG. 1.

FIG. 1 is a front view of a preform shaping apparatus according to the first implementation of the present invention, FIG. 2 is a top view of a mold included in the preform shaping apparatus shown in FIG. 1, FIG. 3 is a right side view of molds included in the preform shaping apparatus shown in FIG. 1, FIG. 4 is a top view of a lower mold included in the preform shaping apparatus shown in FIG. 1, and FIG. 5 is a perspective view of a dry preform produced by the preform shaping apparatus shown in FIG. 1. Note that, chamfered edges, such as round chamfered edges or flat chamfered edges, are omitted in each figure.

A preform shaping apparatus 1 produces a dry preform D using a laminated body F of fiber sheets as a material. The dry preform D is a preform which has been shaped according to a shape of a composite material (FRP) and has not been impregnated with thermosetting resin, and is a material for producing a composite material by the RTM method.

The laminated body F of fiber sheets which is a material of a composite material and the dry preform D can be produced by laminating sheet-like fibers. A tape-like fiber which has not been impregnated with resin is commercialized under the name of a dry tape material. Some fiber sheets, such as a dry tape material, including binder are also commercialized.

Figure 6:
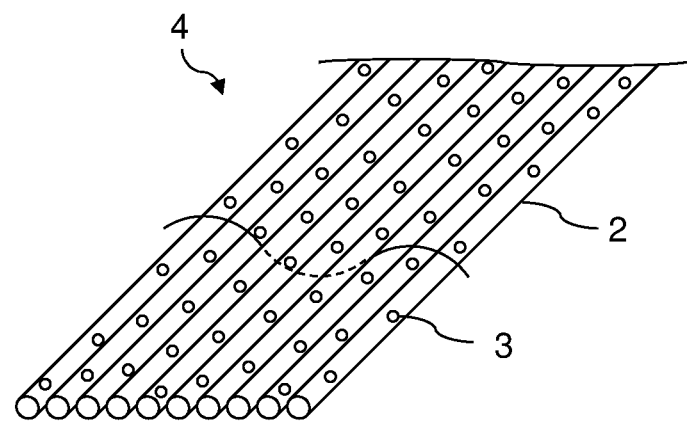
FIG. 6 is a perspective view showing the structure of a fiber sheet on which particulates each consisting of thermoplastic resin have been attached as thermoplastic binder.
Figure 7:
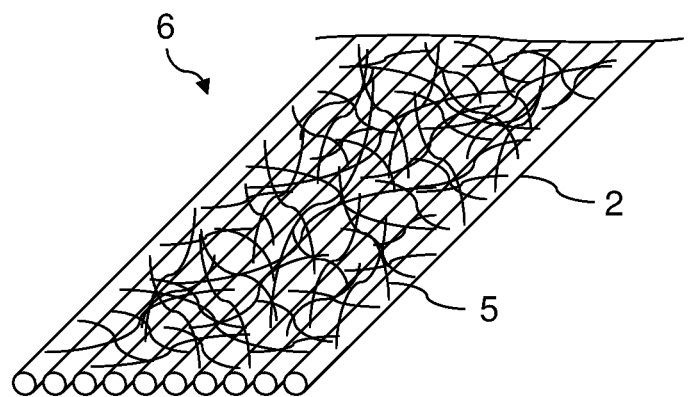
FIG. 7 is a perspective view showing the structure of a fiber sheet on which thermoplastic non-woven fabric has been attached as thermoplastic binder.

FIG. 6 is a perspective view showing the structure of a fiber sheet on which particulates each consisting of thermoplastic resin have been attached as thermoplastic binder while FIG. 7 is a perspective view showing the structure of a fiber sheet on which thermoplastic non-woven fabric has been attached as thermoplastic binder.

As shown in FIG. 6, a dry tape material 4 consisting of a fiber bundle 2, bundled into a sheet shape, and particulates 3 made of thermoplastic resin dredged as thermoplastic binder on the fiber bundle 2 has been marketed. Meanwhile, a dry tape material 6 consisting of a fiber bundle 2, bundled into a sheet shape, and thermoplastic non-woven fabric 5 laminated as thermoplastic binder on the fiber bundle 2 as shown in FIG. 7 has also been marketed. In addition, a fiber sheet on which powdered or liquid thermosetting binder has been attached, and a fiber sheet on which resin, such as elastomer, has been attached as binder are also known.

When a worker manually laminates sheet-like fibers as exemplified in FIG. 6 or FIG. 7 or sheet-like fibers are laminated with an automatic lamination device, the laminated body F of fibers which has many fiber layers can be produced. In order to shape the curved dry preform D which has a web D1 and flanges D2 as exemplified in FIG. 5, it is necessary to apply pressure on the laminated body F of fibers to bend the laminated body F of fibers.

Therefore, the preform shaping apparatus 1 has at least one mold 7 for placing and shaping the laminated body F of fiber sheets. In the illustrated example, the preform shaping apparatus 1 has a lower mold 7A disposed vertically downward and an upper mold 7B disposed vertically upward as the first mold and the second mold for shaping the dry preform D, which has the web D1 and the flanges D2, respectively.

When pressure is applied on the laminated body F of fibers by sandwiching the laminated body F of fibers by a plurality of the molds 7, such as the upper mold 7B and the lower mold 7A, the preform shaping apparatus 1 has a movement mechanism 8 which changes relative positions of the molds 7. Therefore, in the illustrated example, the preform shaping apparatus 1 has the movement mechanism 8 which changes the relative positions of the upper mold 7B and the lower mold 7A.

Note that, pressure may be applied on the laminated body F of fibers by the single mold 7 and vacuum pressure. In that case, the laminated body F of fibers is covered with a bagging film while the preform shaping apparatus 1 has vacuum equipment for evacuating air from an area between the laminated body F of fibers and the bagging film to form a vacuum state.

Henceforth, a concrete example in which the upper mold 7B is moved up and down in the vertical direction by the movement mechanism 8 will be explained as an example of a case where the laminated body F of fibers is pressed by moving at least one of the molds 7 by the movement mechanism 8. As a matter of course, both of the upper mold 7B and the lower mold 7A may be moved by the movement mechanism 8, or the lower mold 7A may be moved by the movement mechanism 8 instead of moving the upper mold 7B. That is, the relative positions in the vertical direction of the lower mold 7A and the upper mold 7B can be changed by the movement mechanism 8.

The movement mechanism 8 is a device which moves the upper mold 7B between a retreated position and a shaping position. The retreated position is a position at which the upper mold 7B has been sufficiently moved up so that the unshaped laminated body F of fiber sheets can be placed on the lower mold 7A while the shaped dry preform D can be removed from the lower mold 7A. Meanwhile, the shaping position is a position at which the upper mold 7B has been moved down in order to shape the dry preform D. Therefore, when the upper mold 7B is at the shaping position, a space equivalent to the thickness of the shaped dry preform D is formed between the upper mold 7B and the lower mold 7A.

The drive mechanism 8 can be composed of desired devices, such as jacks and actuators, each having at least one desired drive system, such as an electric system, a hydraulic system and/or a pneumatic system. More specifically, the drive mechanism 8 can be composed of at least one desired machine element of a cylinder mechanism in which a piston move, a rack and pinion, a ball screw, a traveling mechanism having wheels moving along at least one rail, a crawler, and the like. In the illustrated example, the movement mechanism 8 is composed of a gate type lifting device 8B which moves up and down in the vertical direction along supporting columns 8A.

When the laminated body F of fibers is pressed by driving the movement mechanism 8, it is important to prevent position gaps between the fiber sheets. For that reason, pins 9 thrust into the laminated body F of fibers for preventing position gaps of the fiber sheets are mounted on at least one of the upper mold 7B and the lower mold 7A. In the illustrated example, many pins 9 have been disposed on the surface of the lower mold 7A.

Figure 8:
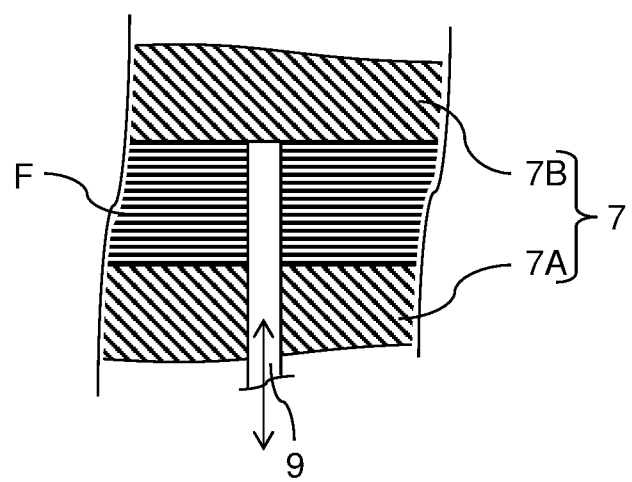
FIG. 8 is an enlarged sectional view showing a state where the laminated body of fibers shown in FIG. 1 has been stabbed with the pin.

FIG. 8 is an enlarged sectional view showing a state where the laminated body F of fibers shown in FIG. 1 has been stabbed with the pin 9.

A material of the pin 9 is flexible as long as the material has such strength that the pin 9 is not broken or bent even when the pin 9 is thrust into the laminated body F of fibers. Accordingly, the pin 9 can be made of a resin, such as a plastic, as well as a metal. When the pin 9 is made of a material, such as a metal, having thermal conductivity, the laminated body F of fibers can be locally heated through the pin 9.

Accordingly, when thermoplastic binder is included in the laminated body F of fibers, it becomes possible to locally and temporarily fix the laminated body F of fibers by locally heating the laminated body F of fibers by the pins 9 and subsequent cooling. Meanwhile, when thermosetting binder is included in the laminated body F of fibers, it becomes possible to locally and temporarily fix the laminated body F of fibers by locally heating the laminated body F of fibers by the pins 9.

The positions of the pins 9 can be determined to positions at which it is important to prevent position gaps of fibers at the time of pressing the laminated body F of fibers. The positions of the pins 9 can be determined not only inside portions of fibers to be removed, such as excess parts, but also inside portions of fibers which become a product. Therefore, the pins 9 can be disposed so that the pins 9 may protrude from the surface of the mold 7 for pressing a portion of fibers which become a product.

For example, when the dry preform D which has the web D1 and the flanges D2 as exemplified in FIG. 5 is shaped, it is important to prevent slippage of fibers in a portion of fibers which becomes the web D1 while it is often important to conversely slide portions of fibers which become the flanges D2, from a viewpoint of preventing wrinkles and rips of the fibers.

That is, the surface of the web D1 is almost a curved surface having a small curvature or a flat surface having no curvature. Accordingly, fibers hardly need to sift between layers when the laminated body F of fibers is pressed. On the contrary, it is desirable to fix the fibers so that the fibers may not shift between the layers when the laminated body F of fibers is pressed.

Meanwhile, as for the portion corresponding to the flange D2, it is necessary to shift the fibers between the layers in order to make the fibers fit the surfaces of the upper mold 7B and the lower mold 7A without generating wrinkles in the fibers. In particular, when the surface of the flange D2 has a curvature, sliding the fibers between the layers leads to suppression of wrinkles.

For that reason, the pins 9 can be made to protrude only from the surface of at least one of the upper mold 7B and the lower mold 7A for pressing the web D1 so that the pins 9 can be thrust only into the laminated body F of fibers which forms the web D1 as illustrated. In other words, the pins 9 may not be made to protrude from the surfaces of the upper mold 7B and the lower mold 7A for pressing each flange D2 so that the pins 9 may not be thrust into the laminated body F of fibers which forms each flange D2.

Moreover, not only the existence of the pins 9 but also the density of the pins 9 can be determined appropriately according to a shape of the dry preform D. Specifically, the pins 9 may be disposed so that the number of the pins 9 per unit area may be uneven, or may be disposed so that the number of the pins 9 per unit area may be even, according to how much important it is to prevent fibers from slipping in a range in which the pins 9 are thrust into the fibers.

The thickness of the pin 9 is determined to such a thickness that the pin 9 can be thrust into the laminated body F of fibers without damaging the fibers while securing strength necessary for thrusting the pin 9 into the laminated body F of fibers. Accordingly, it is considered that it is appropriate to make the thickness of each pin 9 not less than 0.1 mm and not more than 5 mm. In particular, when the thickness of the pin 9 is not less than 0.1 mm and not more than 0.5 mm, and/or when a shape of the pin 9 is like a needle by sharpening the tip of the pin 9, it becomes easy to thrust the pin 9 into the laminated body F of fibers.

The length of the pin 9 is flexible as long as the pin 9 protrudes into the space formed between the lower mold 7A and the upper mold 7B which has been moved to the shaping position. In other words, each pin 9 is disposed so as to protrude into the space formed between the upper mold 7B and the lower mold 7A. Since the longer the length by which the pin 9 protrudes is, the longer the length by which the pin 9 is stuck into the laminated body F of fibers becomes, the anti-slipping effect of fibers can be improved. Therefore, when the distance between the surface of the lower mold 7A and the surface of the upper mold 7B which has been moved to the shaping position is equal to the length of the pin 9 projected from the surface of the lower mold 7A, the anti-slipping effect of the fibers becomes the maximum.

On the contrary, when only slippage between the surface of the lower mold 7A and the laminated body F of fibers should be prevented, it is enough to protrude the pins 9 from the surface of the lower mold 7A to such an extent that the pins 9 are stuck into at least one fiber sheet. In this case, the pins 9 can also be protruded from the surface of the upper mold 7B to such an extent that the pins 9 are stuck into at least one fiber sheet. In such a case, slippage between fiber sheets can be prevented by temporarily fixing them by binder while slippage between the surface of the mold 7 and a fiber sheet, for which the temporarily fixing effect by the binder is low, can be prevented by the pins 9. In particular, the mold 7 is made of a metal in many cases, and therefore protruding the pins 9 from the surface of the mold 7 can prevent slippage between the surface of the mold 7 and a fiber sheet satisfactorily.

In addition, an adjustment mechanism 10 which changes the projection length of the pins 9 from the surface of the lower mold 7A may be mounted. In the illustrated example, the adjustment mechanism 10 which change the position of the pins 9 in the vertical direction together with a heater 11 for heating the pins 9 has been prepared.

When the adjustment mechanism 10 is composed of at least one lifting device, such as an electric actuator, an air cylinder or a hydraulic cylinder, which can position the pins 9 in the vertical direction, the projection length of the pins 9 from the surface of the lower mold 7A can be set to a desired length.

Alternatively, the adjustment mechanism 10 may be composed of at least one elastic body, such as a gas spring or a coil spring. That is, the pins 9 can be attached to the lower mold 7A through at least one elastic body directly or indirectly so that the tips of the pins 9 may project from the lower mold 7A.

In this case, when the upper mold 7B is made to approach the lower mold 7A and moved down to the shaping position by the movement mechanism 8, the tips of the pins 9 are pressed by the surface of the upper mold 7B. Thereby, the projection length of the pins 9 from the lower mold 7A can be made to the distance between the surface of the lower mold 7A for shaping the laminated body F of fibers and the surface of the upper mold 7B for shaping the laminated body F of fibers. That is, it is possible to adjust the projection length of the pins 9, from the surface of the lower mold 7A, to the distance between the surface of the lower mold 7A and the surface of the upper mold 7B while avoiding a trouble that the tips of the pins 9 are bent due to the press by the surface of the upper mold 7B. As a result, the anti-slipping effect of fibers can be maximized Note that, each pin 9 is thin, and therefore one of the pins 9 may stick in an operator or the like. Accordingly, the pins 9 may be storable inside the lower mold 7A in order to secure the safety regardless of whether the adjustment mechanism 10 is composed of at least one elastic body so that the pins 9 can be pushed into the inside of the lower mold 7A or the adjustment mechanism 10 is composed of at least one lifting device which can position the pins 9 in the vertical direction. When the pins 9 are housed inside the lower mold 7A, the concavity and convexity on the surface of the lower mold 7A disappear. Accordingly, an effect of easily placing the laminated body F of fibers on the surface of the lower mold 7A without generating slack and wrinkles in the laminated body F of fibers can also be attained. The function to house the pins 9 inside the lower mold 7A can also be realized by mounting at least one necessary lifting device in the adjustment mechanism 10.

The heater 11 locally heats the laminated body F of fibers by heating the pins 9. A desired device can be used as the heater 11 as long as necessary heat can be given to the pins 9. For example, the heater 11 can be composed of at least one pipe in which heating medium flows, resistance heating elements, at least one conductor heated by electromagnetic induction or current flow, or the like. Since the pins 9 are thrust into the inside of the laminated body F of fibers, not only the surface of the laminated body F of fibers but also the inside of the laminated body F of fibers can be locally heated.

As mentioned above, when thermosetting binder is included in the laminated body F of fibers, the thermosetting binder is partially cured by locally heating the laminated body F of fibers. Accordingly, the dry preform D can be shaped while temporarily fixing fiber sheets. Meanwhile, when thermoplastic binder is included in the laminated body F of fibers, the thermoplastic binder is partially melted by locally heating the laminated body F of fibers. Accordingly, when the shaped dry preform D is cooled down by air cooling or the like, the shape of the dry preform D can be kept since the melted thermoplastic binder is cured.

On the other hand, when the dry preform D is shaped using the laminated body F of fibers, including no binder, as a material, the heater 11 may be omitted. In that case, fibers can be prevented from slipping by the pins 9 at the time of shaping the dry preform D. In other words, the dry preform D can be shaped while preventing fibers from slipping without binder.

(Preform Shaping Method and Composite Material Molding Method)

Next, a preform shaping method for producing the dry preform D by the preform shaping apparatus 1 and a composite material molding method for producing a composite material using the dry preform D, produced in the preform shaping method, as a material will be described.

When the dry preform D is to be produced by the preform shaping apparatus 1, the laminated body F of fibers is produced by laminating fiber sheets, such as the dry tape material 4 exemplified by FIG. 6 or the dry tape material 6 exemplified by FIG. 7. The fibers may be laminated manually by a worker, or by an automatic lamination apparatus.

When the laminated body F of fibers has been produced, the laminated body F of fibers is set to the preform shaping apparatus 1. For that purpose, the movement mechanism 8 moves the upper mold 7B up to the retreated position as shown by chain double-dashed lines in FIG. 1. Then, the laminated body F of fibers is placed on the lower mold 7A.

When the pins 9 are housed inside the lower mold 7A, the adjustment mechanism 10 drives and thereby the tips of the pins 9 are projected from the surface of the lower mold 7A. As a result, the laminated body F of fibers is stung with the pins 9 as exemplified by FIG. 8, and thereby the laminated body F of fibers is fixed to the lower mold 7A. Moreover, since the pins 9 have stuck in the laminated body F of fibers, the fibers are prevented from slipping. When the projection lengths of the pins 9 can be adjusted by the adjustment mechanism 10, the projection lengths of the pins 9 are adjusted. Thereby, the laminated body F of fibers can be stuck with the pins 9 to an appropriate depth.

Next, the movement mechanism 8 drives, and thereby the upper mold 7B is moved down to the shaping position as shown by solid lines in FIG. 1. Consequently, the laminated body F of fibers is sandwiched and pressed by the upper mold 7B and the lower mold 7A. When the upper mold 7B has moved down to the shaping position, a space equivalent to a shape of the dry preform D is generated between the upper mold 7B and the lower mold 7A. Accordingly, the shape of the laminated body F of fibers changes into the shape of the dry preform D. That is, the dry preform D can be produced by shaping the laminated body F of fibers.

At this time, the pins 9 have stuck in the portion corresponding to the web D1, in which slippage between fiber layers should be prevented, out of the laminated body F of fibers, as exemplified by FIG. 1 to FIG. 3. Meanwhile, the pins 9 have not stuck in the portions corresponding to the flanges D2, in which slippage between fiber layers should be generated, out of the laminated body F of fibers.

Moreover, when the adjustment mechanism 10 which adjusts the projection length of each pin 9 is composed of elastic bodies, the pins 9 are pushed inside the lower mold 7A by the surface of the upper mold 7B. Thereby, the projection length of each pin 9 becomes the thickness of the laminated body F of fibers. As a result, the pins 9 stick in all the fiber sheets included in the portion corresponding to the web D1.

Accordingly, wrinkles generated in fibers can be reduced and thereby the dry preform D can be produced with high quality. Note that, holes generated by sticking the pins 9 remain in the produced dry preform D as exemplified by FIG. 5. FIG. 5 shows an example of a case where through holes D3 have been formed in the dry preform D by sticking the pins 9. When the pins 9 are not penetrated, blind holes are formed in the dry preform D.

When binder is included in the laminated body F of fibers, the pins 9 are heated by the heater 11. Accordingly, the laminated body F of fibers is locally heated by the heat conduction from the pins 9. As a result, a form of the shaped dry preform D can be kept.

When the pins 9 can be housed inside the lower mold 7A, the adjustment mechanism 10 drives, and thereby the pins 9 are housed in the lower mold 7A after shaping the dry preform D. Then, the movement mechanism 8 drives, and the upper mold 7B moves to the retreated position as shown by the chain double-dashed lines in FIG. 1. Thereby, the shaped dry preform D can be taken out from the preform shaping apparatus 1.

When the dry preform D is obtained, a composite material can be molded using the dry preform D as material. Specifically, a composite material is molded by the RTM method. For that purpose, the dry preform D is set to jigs for molding a composite material.

Figure 9:
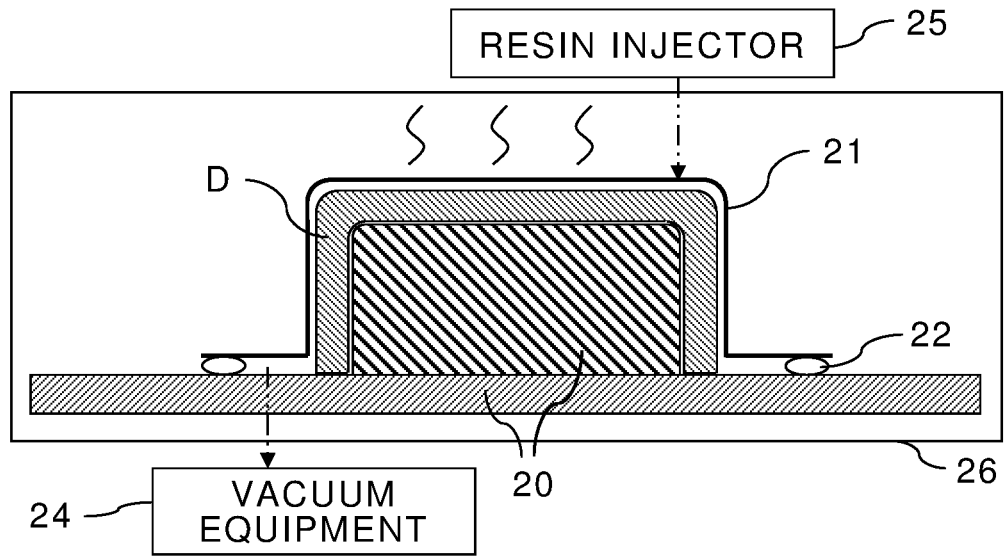
FIG. 9 shows an example of forming a composite material by the VaRTM method.
Figure 10:
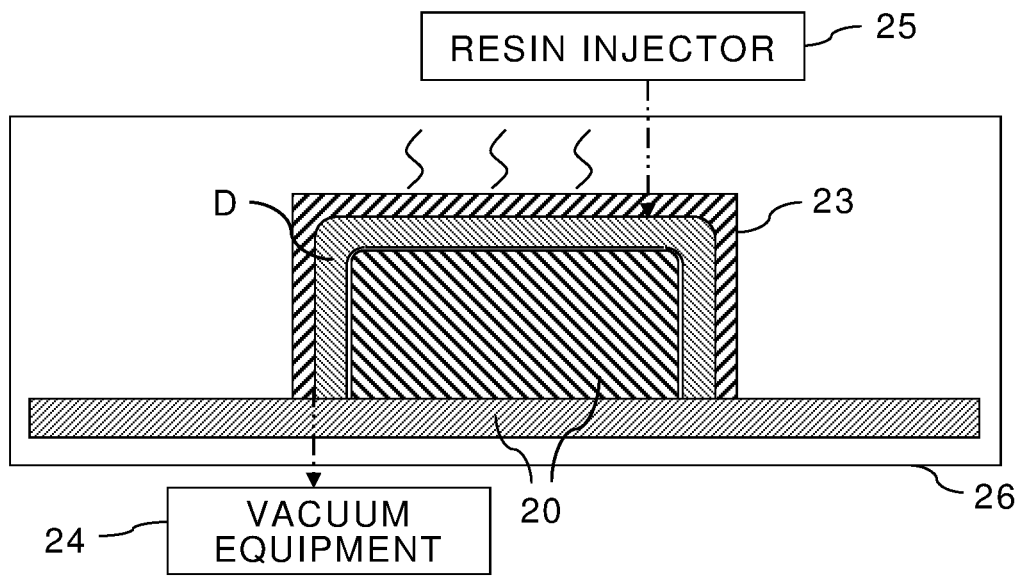
FIG. 10 shows an example of forming a composite material by the Matched-die RTM method.

FIG. 9 shows an example of forming a composite material by the VaRTM method while FIG. 10 shows an example of forming a composite material by the Matched-die RTM method.

When a composite material is molded by VaRTM method, the dry preform D is placed on a lower mold 20 as shown in FIG. 9. Then, the dry preform D is covered with a bagging film 21, and the edges of the bagging film 21 are stuck on the lower mold 20 by sealant 22. Meanwhile, when a composite material is molded by Matched-die RTM method, the dry preform D is set to a space formed between a lower mold 20 and an upper mold 23.

After that, thermosetting resin heated up to such degree that fluidity can be obtained is injected from a resin injecting apparatus 25 into the space in which the dry preform D has been set in a state where the space in which the dry preform D has been set is evacuated by vacuum equipment 24. Thereby, the dry preform D can be impregnated with the thermosetting resin.

Next, the thermosetting resin is heated by a heater 26, such as an oven, so that the temperature of the thermosetting resin may rise up to the curing temperature. Thereby, the thermosetting resin can be cured and a composite material having a shape corresponding to the shape of the dry preform D having the web D1 and the flanges D2 can be molded.

Note that, a composite material may be molded by the preform shaping apparatus 1 without re-putting the dry preform D on jigs for molding a composite material. In that case, it is realistic to omit the adjustment mechanism 10 and have such a structure that the projection length of the pins 9 may not be adjusted since vacuuming and injecting resin are accompanied by molding the composite material.

(Effects)

The above-mentioned preform shaping apparatus 1, preform shaping method and composite material molding method shape the dry preform D while preventing fiber layers from slipping with the pins 9.

Therefore, according to the preform shaping apparatus 1, the preform shaping method and the composite material molding method, position gaps between fiber layers, which lead to degradation in quality of the dry preform D, can be reduced. As a result, the dry preform D and a composite material can be produced with stable quality.

Second Implementation

Figure 11:
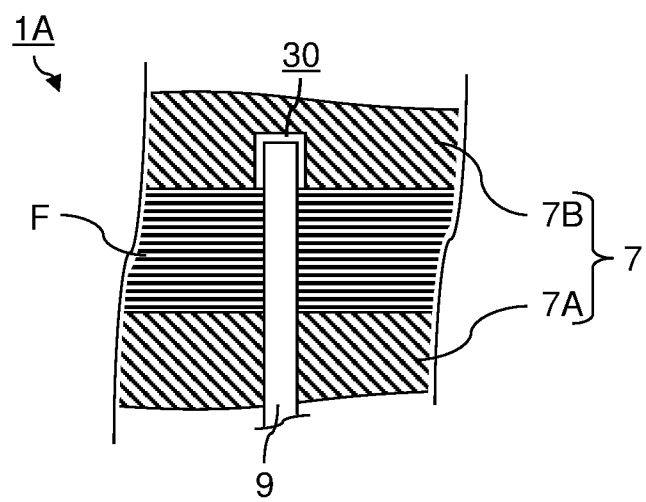
FIG. 11 is an enlarged sectional view of molds included in a preform shaping apparatus according to the second implementation of the present invention.

FIG. 11 is an enlarged sectional view of molds included in a preform shaping apparatus according to the second implementation of the present invention.

A preform shaping apparatus 1A in the second implementation shown in FIG. 11 is different from the preform shaping apparatus 1 in the first implementation in a point that clearances 30 for avoiding interference with the tips of the pins 9 are formed on the surface of the mold 7. Since other structures and actions of the preform shaping apparatus 1A in the second implementation are not substantially different from those of the preform shaping apparatus 1 in the first implementation, only an enlarged cross section of the mold 7 is illustrated. Then, same signs are attached to the same elements and the corresponding elements while explanation thereof is omitted.

As exemplified by FIG. 11, each pin 9 can be attached directly or indirectly to the lower mold 7A so that the tip of each pin 9 may project from the lower mold 7A. Meanwhile, the clearances 30, such as holes or grooves, for avoiding interference with the tips of the pins 9 respectively can be formed on the upper mold 7B.

In this case, it becomes possible to make the positions of the tips of the pins 9 be inside the clearances 30 formed on the upper mold 7B respectively. Specifically, the pins 9 can be disposed so that the pins 9 may project from the surface of the lower mold 7A while the positions of the tips of the pins 9 may not lie between the surface of the upper mold 7B for shaping the laminated body F of fibers and the surface of the lower mold 7A for shaping the laminated body F of fibers.

Therefore, according to the second implementation, it becomes possible to prevent fibers from slipping in all the layers since the pins 9 certainly pass through the laminated body F of fibers. As a matter of course, the pins 9 may be attached to the upper mold 7B while the clearances 30 may be formed on the lower mold 7A. Moreover, the adjustment mechanism 10 may be mounted so that the pins 9 can be housed in the lower mold 7A or the upper mold 7B, similarly to the first implementation.

Third Implementation

Figure 12:
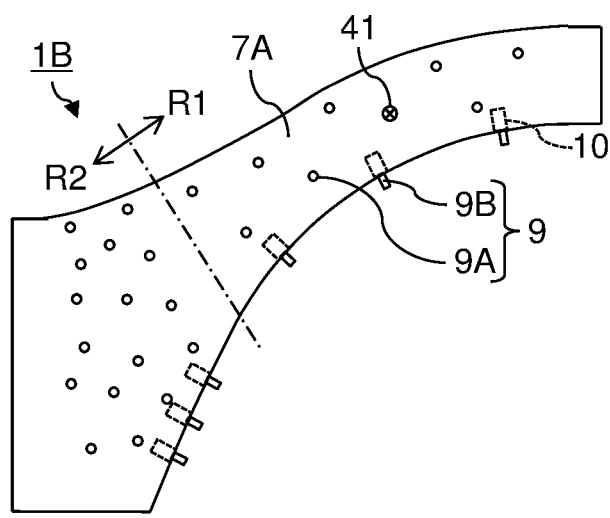
FIG. 12 is a top view of a lower mold included in a preform shaping apparatus according to the third implementation of the present invention.
Figure 13:
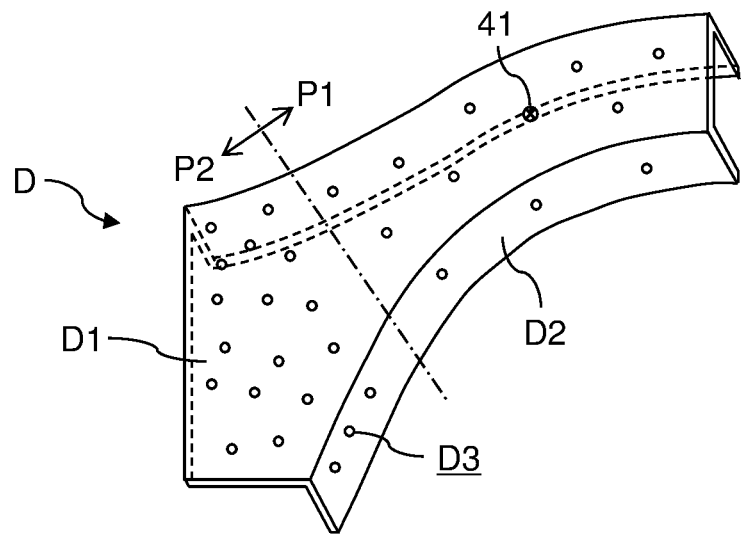
FIG. 13 is a perspective view of a dry preform produced by the preform shaping apparatus having the lower mold shown in FIG. 12.

FIG. 12 is a top view of a lower mold included in a preform shaping apparatus according to the third implementation of the present invention, and FIG. 13 is a perspective view of a dry preform produced by the preform shaping apparatus having the lower mold shown in FIG. 12. Note that, chamfered edges, such as round chamfered edges or flat chamfered edges, are omitted in each figure.

A preform shaping apparatus 1B in the third implementation shown in FIG. 12 is different from each of the preform shaping apparatus 1 in the first implementation and the preform shaping apparatus 1A in the second implementation in a point that the pins 9 are disposed so that the number per unit area of the pins 9 may become inhomogeneous. Since other structures and actions of the preform shaping apparatus 1B in the third implementation are not substantially different from those of each of the preform shaping apparatus 1 in the first implementation and the preform shaping apparatus 1A in the second implementation, only an arrangement example of the pins 9 is illustrated. Then, same signs are attached to the same elements and the corresponding elements while explanation thereof is omitted.

The shaped dry preform D is impregnated with thermosetting resin in order to mold a composite material as exemplified by FIG. 9 or FIG. 10. For that purpose, the resin is injected from a designated position to a decompression space in which the dry preform D has been set. The position for injecting the resin is determined so that the resin can permeate all over the dry preform D as far as possible in a shorter time. Therefore, the resin is injected from a relatively high position.

Figure 14:
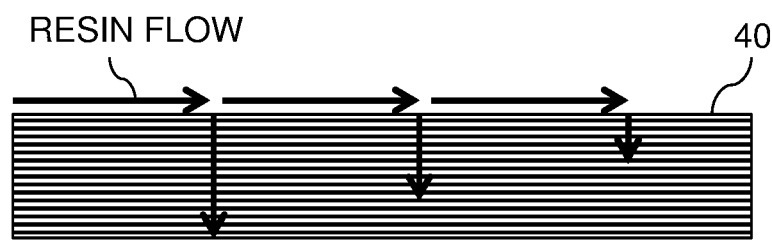
FIG. 14 shows an aspect that the conventional typical dry preform is being impregnated with resin.

FIG. 14 shows an aspect that the conventional typical dry preform is being impregnated with resin.

When resin is injected from an injection port of the resin into a decompression space in order to impregnate a conventional dry preform 40 with the resin, the resin tends to earlier permeate end parts, such as chamfered portion and edges, along the surface of the dry preform 40, and subsequently permeate middles. Moreover, the resin tends to gradually permeate in the thickness direction of the dry preform 40 after the resin has flown on the surface of the dry preform 40 as exemplified by FIG. 14.

Therefore, the periods until the resin reaches positions away from the injection port of the resin and central portions away from end portions of the dry preform 40 become relatively long. Therefore, penetration of the resin in the thickness direction also becomes late at positions away from the injection port of the resin and central portions away from end portions of the dry preform 40. In particular, when the density of fibers is high, the penetration period of the resin in the thickness direction of the dry preform 40 becomes long. As a result, differences in arrival time of the resin between respective portions of the dry preform 40 become remarkable. In this case, the viscosity of the resin increases and curing reaction of the resin may begin before the resin spreads to all the portions. In such a case, voids may arise in a molded composite material.

Figure 15:
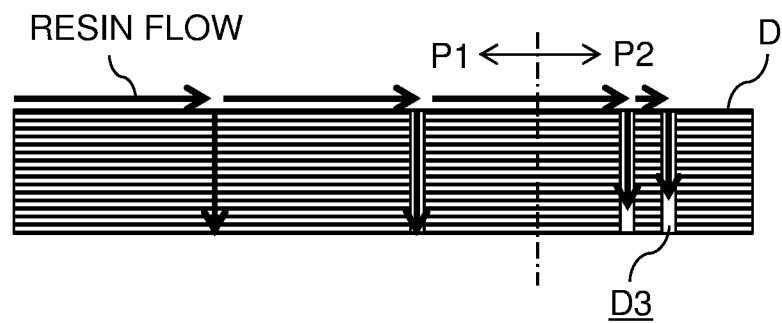
FIG. 15 is shows an aspect that the dry preform produced by the preform shaping apparatus shown in FIG. 12 is being impregnated with resin.

FIG. 15 shows an aspect that the dry preform D produced by the preform shaping apparatus 1B shown in FIG. 12 is being impregnated with resin.

When the dry preform D is produced by the preform shaping apparatus 1B, holes, such as through holes D3, are formed in the dry preform D, as traces left by sticking the pins 9, as exemplified by FIG. 13. The holes, such as the through holes D3, formed in the dry preform D can be used as flow channels for penetrating the resin at the time of molding a composite material as shown in FIG. 15.

For that reason, the arrangement density of the pins 9 can be made high in each area where it takes relatively long time until the resin arrives while the arrangement density of the pins 9 can be made low in each area where it takes relatively short time until the resin arrives. That is, the more pins 9 can be disposed at positions where it takes relatively longer time until the resin arrives.

As a concrete example, the pins 9 can be disposed at a relatively low density in a range R1 of the lower mold 7A which is relatively close to a position 41 corresponding to an injection port for starting the impregnation of the resin into the dry preform D while the pins 9 can be disposed at a relatively high density in a range R2 of the lower mold 7A which is relatively far from the position 41 corresponding to the injection port for starting the impregnation of the resin into the dry preform D. In this case, when the dry preform D is produced, the laminated body F of fibers can be stung with the more pins 9 at positions farther away from the position 41 corresponding to the injection port from which the impregnation of the resin into the dry preform D is started.

As a result, as exemplified by FIG. 13, holes, such as the through holes D3, can be formed in the dry preform D with a relatively low arrangement density in a portion P1 relatively close to the position 41 corresponding to the injection port of the resin while holes, such as the through holes D3, can be formed in the dry preform D with a relatively high arrangement density in a portion P2 relatively away from the position 41 corresponding to the injection port of the resin.

Thereby, differences in arrival time of resin can be reduced. That is, penetration of resin into the portion P2 which the resin is hard to permeate can be facilitated by forming relatively more holes, such as the through holes D3, in the portion P2, which the resin is hard to permeate, than those in the portion P1, which the resin easily permeate, as exemplified by FIG. 15. In particular, the penetration period of resin in the thickness direction of the dry preform D can be locally shortened near the holes, such as the through holes D3. As a result, generation of resin rich portions in which the resin stays excessively and generation of voids caused when the resin does not arrive can be suppressed, and thereby it becomes possible to mold a composite material with high quality.

Note that, when not only the pins 9A are disposed on the surface of the lower mold 7A for pressing the web D1 but also the pins 9B are disposed on the surface of the lower mold 7A for pressing the flange D2 as exemplified by FIG. 12, it is appropriate to allow the pins 9B to be housed in the lower mold 7A by the adjustment mechanism 10 so that the pins 9B can be projected after pressing the portion corresponding to the flange D2. That is, it is appropriate to project and thrust the pins 9B into the laminated body F of fibers forming the flange D2 after the dry preform D has been shaped, from a viewpoint of preventing the fibers in the flange D2 from wrinkling.

In that case, the portion corresponding to the flange D2 can be temporarily fixed by binder while preventing fiber layers in the portion corresponding to the flange D2 from slipping by the pins 9. After that, holes, such as the through holes D3, formed in the portion corresponding to the flange D2 can be used as flow channels of resin at the time of molding a composite material. In other words, holes, such as the through holes D3, can be formed also in a portion, such as the flange D2, in which slippage of fibers should be positively generated at the time of shaping the dry preform D, by thrusting the pins 9B after shaping the dry preform D, in order to form flow channels of resin in the thickness direction of the dry preform D.

Other Implementations

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, although a case in which the pins 9 are mounted on at least one of the molds 7, such as the upper mold 7B and/or the lower mold 7A, has been explained in each of the above-mentioned implementations, slippage of fibers may be prevented by manually sticking the pins 9 into the laminated body F of fibers by a worker. In that case, holes for inserting the pins 9 may be formed on at least one of the molds 7.

Moreover, fiber sheets may be placed on the lower mold 7A and bent alternately one by one, instead of laminating all the fiber sheets to produce the laminated body F of fibers, and subsequently placing the laminated body F of fibers on the lower mold 7A. In other words, the lower mold 7A may be used as a jig for laminating fibers.

Moreover, fibers can be prevented from slipping by the pins 9 in order to shape not only the dry preform D having the web D1 and the flanges D2 but also a dry preform having a desired shape, such as a simple plate-like dry preform as well as a dry preform having a complicated shape. In addition, holes can be formed in a dry preform by the pins 9 in order to form flow channels of resin in the dry preform.

Moreover, the laminated body F of fibers may be locally heated by another heater, such as an ultrasonic welding device, instead of heating the laminated body F of fibers by the pins 9. In that case, each pin 9 may be made of a material, such as a resin, having low thermal conductivity as mentioned above.

Moreover, although a case where resin included in a composite material is thermosetting resin has been explained in each above-mentioned example, a composite material may be made of thermoplastic resin. The thermoplastic resins fall into the general classification of crystalline resin and amorphous resin. Concrete examples of crystalline resin include polyester resin, polyamide resin, polyethylene resin, and polypropylene resin. Meanwhile, concrete examples of amorphous resin include polystyrene resin, ABS resin (acrylonitrile, butadiene, and copolymerization synthetic resin of styrene), and polycarbonate resin.

When a composite material is molded using thermoplastic resin, the dry preform D is impregnated with the thermoplastic resin to which fluidity has been given by heating and melting. Then, the thermoplastic resin with which the dry preform D has been impregnated can be cured by cooling the thermoplastic resin. Therefore, a cooling device may be disposed for cooling and curing thermoplastic resin instead of the heater 26 for thermally curing thermosetting resin. Alternatively, thermoplastic resin may be cured by air cooling without any cooling device.

What is claimed is:

1. A preform shaping apparatus comprising:
   at least one mold for placing and shaping a laminated body of fiber sheets which is a material of a fiber reinforced plastic; and
   at least one pin that prevents the fiber sheets from being misaligned by stinging the laminated body of the fiber sheets with the at least one pin,
   wherein the at least one mold includes:
      a first mold; and
      a second mold opposite to the first mold,
   wherein the at least one pin is projected from a first surface of the first mold toward the second mold,
   wherein the second mold includes:
      a second surface; and
      a clearance adjacent to and penetrating into the second surface, the clearance being a hole or a groove that penetrates into the second mold having an opening surrounded by the second surface, and
   wherein the at least one pin is configured, in a state where the surface of the second mold is in contact with a surface of the laminated body of the fiber sheets, to be inside the clearance in order to avoid interference with the second mold.

2. The preform shaping apparatus according to claim 1, wherein the at least one pin has a thickness by which strength necessary for stinging the laminated body of the fiber sheets with the at least one pin can be secured while the laminated body of the fiber sheets can be stung with the at least one pin without damaging fibers in the fiber sheets.

3. The preform shaping apparatus according to claim 1, wherein the at least one pin has a shape of a needle, and
   wherein the needle includes the tip and the tip is sharp.

4. The preform shaping apparatus according to claim 1, wherein the at least one pin has a thickness of not less than 0.1 mm and not more than 5 mm.

5. The preform shaping apparatus according to claim 1, wherein the at least one pin is projected in a space between the first mold and the second mold,
   further comprising:
      a movement mechanism having at least one mechanism of a jack, an actuator, a cylinder mechanism in which a piston move, a rack and pinion, a ball screw, a traveling mechanism having wheels moving along at least one rail, and a crawler that changes relative positions of the first mold and the second mold.

6. The preform shaping apparatus according to claim 1, further comprising:
      a heater that heats the at least one pin.

7. The preform shaping apparatus according to claim 1, wherein the at least one pin includes pins of which a disposed number per unit area is inhomogeneous.

8. The preform shaping apparatus according to claim 5, wherein the at least one mechanism changes the relative positions of the first mold and the second mold in a vertical direction.

9. The preform shaping apparatus according to claim 1, wherein the first mold includes:
      a position corresponding to an injection port for starting an impregnation of resin into the laminated body of the fiber sheets;
      a first range; and
      a second range closer to the position than the first range, and
   wherein the at least one pin includes:
      first pins projecting from the first range; and
      second pins projecting from the second range and being disposed with lower density than density of the first pins.

10. The preform shaping apparatus according to claim 1, wherein a width of the clearance is greater than a width of the pin.

11. A preform shaping method comprising:
    producing a preform by the preform shaping apparatus according to claim 1.

12. The preform shaping method according to claim 11, wherein the preform having a web and a flange is shaped without stinging a portion of the laminated body of the fiber sheets with the at least one pin, the portion being formed into the flange.

13. The preform shaping method according to claim 11, wherein the preform having a web and a flange is shaped, a portion of the laminated body of the fiber sheets being stung by the at least one pin projected after shaping the preform, the portion being formed into the flange.

14. A composite material molding method comprising:
    producing the fiber reinforced plastic by impregnating the preform with resin, and curing the resin, the preform being produced by the preform shaping method according to claim 11.

15. The composite material molding method according to claim 14,
    wherein the at least one pin includes first pins and second pins more than the first pins,
    the laminated body of the fiber sheets is stung by the first pins at first positions while the laminated body of the fiber sheets is stung by the second pins at second positions in order to produce the preform, and
    each of the second positions is more distant from a position, for starting impregnation of the preform with the resin, than each of the first positions.

* * * * *